United States Patent [19]

Middleton et al.

[11] 4,165,733
[45] Aug. 28, 1979

[54] SOLAR ENERGY COLLECTOR SYSTEM

[75] Inventors: Verne L. Middleton, East Alton, Ill.; Charles A. Kleine, Florissant, Mo.

[73] Assignee: Olin Corporation, New Haven, Conn.

[21] Appl. No.: 783,341

[22] Filed: Mar. 31, 1977

[51] Int. Cl.² .............................................. F24J 3/02
[52] U.S. Cl. ...................................... 126/420; 165/11; 126/447
[58] Field of Search ...................... 126/271; 165/11, 48

[56] References Cited

U.S. PATENT DOCUMENTS

| | | | |
|---|---|---|---|
| 3,117,621 | 1/1964 | Bockhorst | 165/70 |
| 3,981,295 | 7/1975 | Minnick | 126/271 |
| 3,987,782 | 6/1975 | Meier | 126/271 |
| 3,999,536 | 3/1975 | Bauer et al. | 126/271 |
| 4,063,545 | 12/1977 | Hapgood | 126/271 |
| 4,066,121 | 3/1978 | Kleine et al. | 126/271 |

Primary Examiner—Samuel Scott
Assistant Examiner—Margaret A. Focarino
Attorney, Agent, or Firm—Victor A. DiPalma; Paul Weinstein

[57] ABSTRACT

A solar energy collector system including at least one heat exchange panel posessing a system of internal tubular passageways defining opposed headers connected by connecting portions of said passageways extending therebetween, said passageways including entry and exit portions extending from opposing ends of said headers to provide ingress and egress openings for a heat exchange medium. The panels include at least one internal, second passageway adjacent and in juxtaposition to said internal tubular passageways but spaced therefrom and independent therefrom.

8 Claims, 11 Drawing Figures

U.S. Patent Aug. 28, 1979 Sheet 1 of 2 4,165,733

SOLAR ENERGY COLLECTOR SYSTEM

BACKGROUND OF THE INVENTION

The present invention relates to a solar energy collector system including at least one metal panel having a system of internal tubular passageways disposed between spaced apart portions of the thickness of the panel. A heat exchange medium is circulated through said passageways wherein said panels utilize solar energy for elevating the temperature of the heat exchange medium.

It is well known that the radiation of the sun can be collected as a source of energy for heating or cooling or for direct conversion to electricity. Heating and cooling based on solar energy depend upon collection of rays of solar energy in a fluid heat transfer system. The heated fluid is pumped or allowed to flow to a place of utilization for the thermal energy it has acquired, with a temperature sensing device employed in association with the panel for controlling the circulation of fluid therethrough.

In certain areas of the world, solar energy is the most abundant form of available energy if it can be harnessed economically. Even in more developed areas of the world, the economic harnessing of solar energy would provide an attractive alternative to the use of fossil fuels for energy generation particularly in this era of increased fuel costs.

One of the problems attending the development of an efficient system for the conversion of solar energy resides with the specific structure and design of the solar energy absorbing device or solar collector. This solar energy collector generally comprises a rectangular plate-like structure possessing channels or passageways therein for the circulation of the energy absorbing fluid medium. Conventionally, these channels comprise a pair of opposed expanded passageways, known as headers, which are placed at opposite ends of the panel, and are connected by a plurality of tubular passageways which are often in parallel relation with respect to each other. In addition, it is necessary to provide a temperature sensing device in association with the plate-like structure in order to accurately and efficiently determine the temperature thereof and control the circulation of said heat exchange medium throughout the system. A plurality of these temperature sensing devices are often employed depending upon the particular system in order to provide very accurate temperature control and a highly efficient system. In addition, it is often desirable to provide other means in association with the panel or plate-like structure, such as a desiccant in order to absorb moisture from the closed system wherein the plate-like structure resides. That is, the plate-like structure is generally enclosed by a glass plate and it is desirable to absorb moisture from between the panel and glass plate.

A represenatative panel structure is shown in our co-pending U.S. patent application Ser. No. 573,953, filed May 2, 1975, and now abandoned, the disclosure of which is incorporated herein by reference. In accordance with said co-pending application, it was determined that improved flow characteristics are obtainable in such a rectangular plate-like structure by a modification of the disposition of the headers wherein the headers define an angle of at least 91° with respect to the direction of flow of the heat exchange medium.

The aforementioned temperature sensing devices or other means are normally associated with the panel or plate-like structure by adhering same to the outside surface of the plate-like structure in a secondary operation. This represents an inefficient method which does not obtain maximum efficiency in the solar collector system. Also, it represents a costly secondary operation which may not result in accurate temperature determination.

Accordingly, it is a principal object of the present invention to provide an improved solar energy collector system.

It is a still further object of the present invention to provide an improved solar energy collector system including at least one heat exchange panel possessing a system of internal tubular passageways wherein said panel is suitable for integral internal disposition of a second passageway system which may be used in containing a control means, such as a temperature sensing device.

Further objects and advantages of the present invention will appear hereinbelow.

SUMMARY OF THE INVENTION

In accordance with the present invention, the foregoing objects and advantages may be readily achieved and an improved solar energy collector system provided. The improved solar energy collector system of the present invention includes at least one heat exchange panel possessing a system of internal tubular passageways defining opposed headers connected by connecting portions of said passageways extending therebetween, said passageways including entry and exit portions extending from opposed ends of said headers to provide ingress and egress openings for said heat exchange medium. Preferably, a common distribution manifold is connected to each of said entry portions and a common collection manifold is connected to each of said exit portions. The improvement of the present invention comprises the provision of at least one internal second passageway in said heat exchange panel adjacent and in juxtaposition to said internal tubular passageways but spaced therefrom and independent therefrom. In the preferred embodiment two of said second passageways are provided, one of which is adjacent the entry portion and one of which is adjacent the exit portion. Generally, a control means is provided within said second passageway, such as a temperature sensing device operatively connected to means for controlling the flow of said heat exchange medium within the panel. The temperature sensing device may be connected to a control box which energizes a pump at a preselected temperature, for example 100° F., to move the heat exchange medium through the system. The second passageway is provided with a crimped inlet opening terminating at an edge of said panel so that the control means may be firmly held within the second passageway. Alternatively, the second passageway may be used to hold other suitable means, such as a desiccant charge to absorb moisture between the panel and a glass cover which is generally provided over the panel. In this instance, a plurality of holes is provided in the second passageway.

It can be readily seen that the solar energy collector system of the present invention achieves numerous and significant advantages. The second passageway provides an appropriate receptacle at any desired location integral with the heat exchange panel. The second passageway can be of virtually any appropriate size for the desired function. If a temperature sensing device is employed, said device can be located very close to the outlet or inlet tubes or both without interfering with the fluid flow within the system. This can provide a very accurate temperature sensing means within the panel itself, which is more accurate than a temperature sensing device attached to the outside of the panel. Also, the fact that the second passageway can be crimped shut provides a very secure assembly making it virtually impossible to dislodge the temperature sensing device while permitting opening for maintenance if desired. Also, these advantages are obtained inexpensively without the necessity for a costly secondary attachment operation. Alternatively, other means may be conveniently provided within the second passageway, such as a desiccant bag with appropriate holes drilled in the metal adjacent the second passageway. As a still further alternative, the control means within the second passageway may comprise a low wattage heater for use under freezing conditions.

DETAILED DESCRIPTION OF PREFERRED EMBODIMENTS

Figure 1:
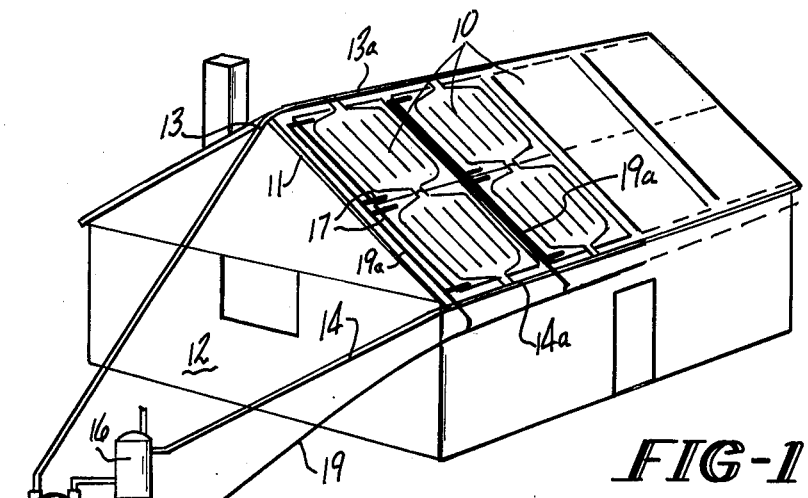
FIG. 1 is a diagram showing schematically the solar energy collector system of the present invention including the manner in which the panels of the present invention can be employed.

The panels of the present invention are utilized in a solar energy collector system as shown in FIG. 1 wherein a plurality of panels of the present invention 10 are mounted on a roof 11 of building 12 with conduits 13 and 14 connected in any convenient fashion to the balance of the solar energy collector system which may be in the building. Thus, for example, cold water may pass into conduit 13 from the building 12 or may from a structure exterior thereto by means of conventional pump 15 or the like. The water flows along common manifold 13a and is distributed into panels 10. The water flows through panels 10, is heated by means of solar energy, is collected in common manifold 14a and flows into conduit 14 for storage in storage chamber 16 or utilization in a heat exchange system inside the building in a known manner. The exact construction of the pump, storage and utilization means are well known and are only shown schematically herein. Naturally, if desired the water flow may be reversed with the cold water entering via conduit 14 and collected via conduit 13. Alternatively, the solar collector system of the present invention may be used or placed in any suitable environment, such as on the ground with suitable fasteners to prevent displacement by wind or gravity. It has been found that the solar energy collector system of the present invention may be readily used for residential heating purposes, such as providing hot water in a residential environment. For example, three panels in a solar energy collector system of the present invention having dimensions of 8'×4' would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system being heated in the solar unit and delivered to an insulated cistern or storage chamber such as is shown schematically by reference numeral 16 in FIG. 1 so that the heated fluid may be stored up during sunshine for use on cool, cloudy days or at night when the heating of the fluid in the panel will not be of sufficient degree to provide the desired heat at the point of use.

A temperature sensing device, the exact disposition of which will be discussed hereinbelow, is provided in the solar energy collector system of the present invention to turn on pump 15 whenever the temperature reaches a predetermined reading. The pump will then pump the water through the system as generally outlined above. FIG. 1 shows a plurality of temperature sensing devices 17 connected to control box 18 via manifolds 19a and line 19.

Figure 2:
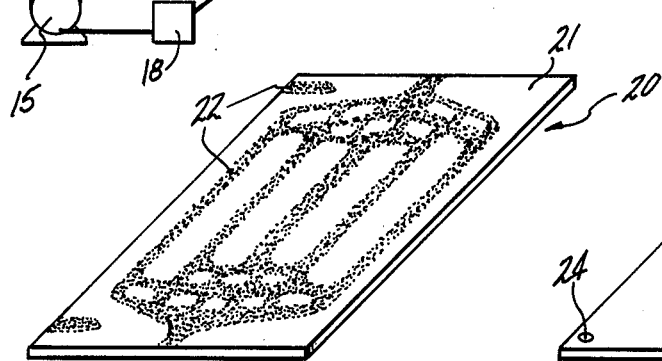
FIG. 2 is a perspective view of a sheet of metal having a pattern of weld inhibiting material applied to a surface thereof.
Figure 3:
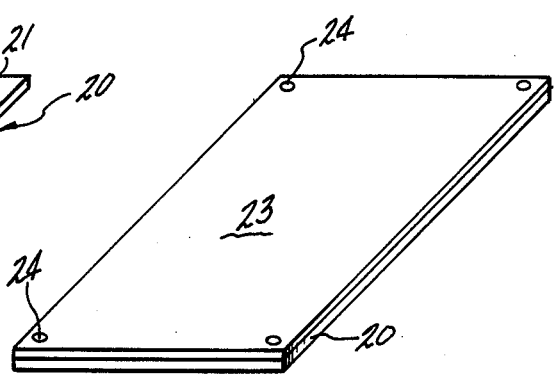
FIG. 3 is a perspective view of a composite metal blank wherein a second sheet of metal is superimposed on the sheet of metal shown in FIG. 2 with the pattern of weld inhibiting material sandwiched therebetween.
Figure 4:
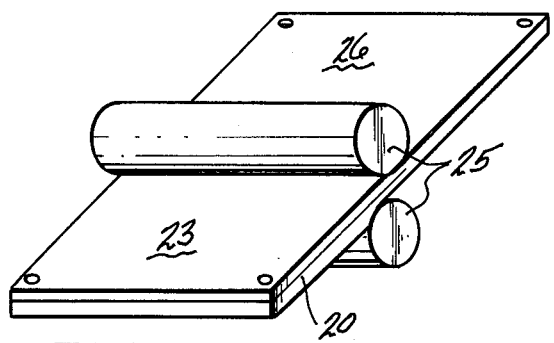
FIG. 4 is a schematic perspective view showing the sheets of FIG. 3 being welded together while passing through a pair of mill rolls.
Figure 7:
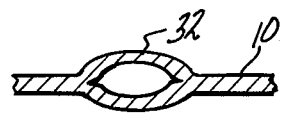
FIG. 7 is an alternate view showing a variation in tube configuration similar to the view of FIG. 6.
Figure 6:
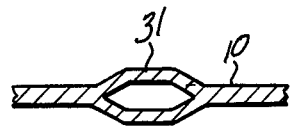
FIG. 6 is a sectional view taken along lines 6—6 of FIG. 5.
Figure 5:
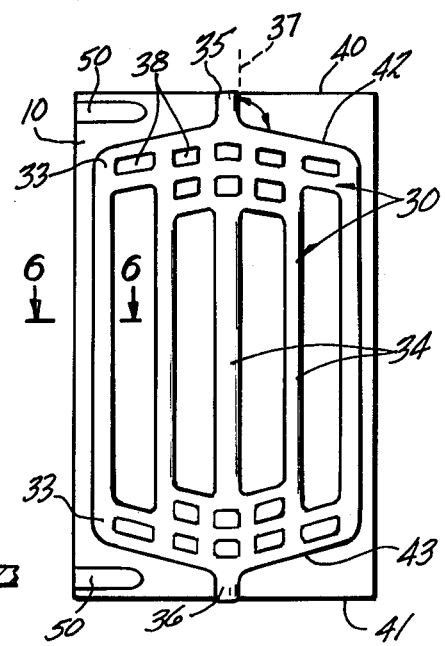
FIG. 5 is a top view showing a panel of the present invention having a system of internal tubular passageways disposed between spaced apart portions of the thickness of the panel in areas of the weld inhibiting material and also having at least one internal second passageway in areas of weld inhibiting material.

As indicated hereinabove, the solar energy collector system of the present invention includes at least one heat exchange panel possessing a system of internal tubular passageways defining opposed headers connected by connecting portions of said passageways extending therebetween, said passageways including entry and exit portions extending from opposed ends of said headers to provide ingress and egress openings for a heat exchange medium. As will be seen hereinbelow, the panels utilized in the system of the present invention have a particularly preferred design for optimum efficiency. The metal panel or plate used in the system of the present invention is desirably fabricated by the ROLL-BOND ® process as shown in U.S. Pat. No. 2,690,002. FIG. 2 illustrates a single sheet of metal 20, such as aluminum or copper or alloys thereof having applied to a clean surface 21 thereof a weld inhibiting material 22 corresponding to the ultimate desired passageway system and to the desired second passageway system. FIG. 3 shows the sheet 20 having superimposed thereon a second sheet 23 with the patterns of weld inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art. The resultant blank 26 is characterized by the sheets 20 and 23 being welded together except at the areas of the weld inhibiting material 22. Blank 26 with the unjoined inner portion corresponding to the patterns of weld inhibiting material 22 may then be softened in any appropriate manner as by annealing, and thereafter the blank may be cold rolled to provide a more even thickness and again annealed. The portions of the panel adjacent the weld inhibiting material 22 are then inflated by the introduction of fluid distending pressure, such as air or water, in a manner well known in the art to form a system of internal tubular passageways 30 corresponding to the passageway pattern of weld inhibiting material shown in FIG. 5. The passageways 30 extend internally within panel 10 and are disposed between spaced apart portions of the thickness of the panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If on the other hand, passageways 30 are formed without the presence of superimposed platens the resultant passageway configuration has a semicircular shape 32 as shown in FIG. 7. In addition to the foregoing, panel 10 also includes at least one second passageway 50 disposed between spaced apart portions of the thickness of the panel. The second passageways 50 are inflated by the introduction of fluid distending pressure in the same manner as the system of fluid passageways 30. If a plurality of second passageways 50 are provided, they may be simultaneously expanded by manifolding the inflation apparatus so that fluid distending pressure is simultaneously introduced into the plurality of said second passageways. As can be seen in FIG. 5, the internal second passageways are preferably located adjacent and in juxtaposition to the internal tubular passageways 30 but spaced therefrom and independent therefrom. In accordance with the embodiment shown in FIG. 5, two of said second passageways are provided, one of which is adjacent entry portion 35 and the other of which is adjacent exit portion 36.

As shown in FIG. 5, the passageways 30 include opposed headers 33 connected by connecting portions 34 of said passageways of substantially uniform cross section extending substantially longitudinally in panel 10 between headers 33 and interconnecting same, with the opposed headers 33 extending in a direction substantially transverse to said longitudinal passageways. Preferably, opposed headers 33 are connected by a plurality of spaced, parallel individual connecting portions 34 of said passageways extending between the headers.

In accordance with the present invention, the passageways include entry portion 35 and exit portion 36 extending from the opposite ends of headers 33 to opposed edges 40 and 41 of panel 10 to provide ingress and egress openings for the heat exchange medium. Headers 33 possess outer edges or boundary sides 42 and 43, respectively, defining the perimeter thereof adjacent entry portion 35 and exit portion 36, respectively, extending therefrom. In a preferred embodiment of the present invention the headers 33 define an angle of at least 91° with respect to the direction of fluid flow, indicated by phantom line 37 in FIG. 5. Thus, the external angle is defined by line 37 and adjacent boundary side 40 of header 33 and may generally range from 92° to 100°, preferably from 92½° to 97½°. If desired, the connecting portions 34 may also define angles of at least 1° with respect to the direction of fluid flow (not shown). In all of the above instances where angles have been defined, it is to be understood that said angles are measured as they lie in the plane of the panel and comprise the convergence of the boundary side and connecting portion respectively with the longitudinal dimension of the panel represented by the line extended in phantom. The foregoing is more completely described in co-pending U.S. patent application Ser. No. 632,502 now U.S. Pat. No. 4,109,711 issued Aug. 29, 1978, by the inventors herein, the disclosure of which is incorporated herein by reference.

The provision of an angled header, and if desired angled connecting portions, enables uniform fluid distribution within panel 10. Thus, one provides a means to fully drain fluid from the unit and to provide a drain for collected gases thereby preventing air locks. Proper drainage mitigates the possibility of internal solution freezing in the unit with possible subsequent expansion and tube wall fracture. In addition, proper fluid drainage eliminates the possibility of sediment collecting in the unit which would create an environment conducive to corrosion. Also, a more efficient solar energy collector system is provided.

An additional feature of the panels utilized in the system of the present invention is to provide headers 33 that include bonded portions 38 of metal which is welded together to provide improved header strength, improved fluid flow control and directionality and interruption in the flow of the heat exchange medium. This can be readily provided in accordance with the present invention by simply not including weld preventive material where one desires to provide the bonded portions 38.

Figure 9:
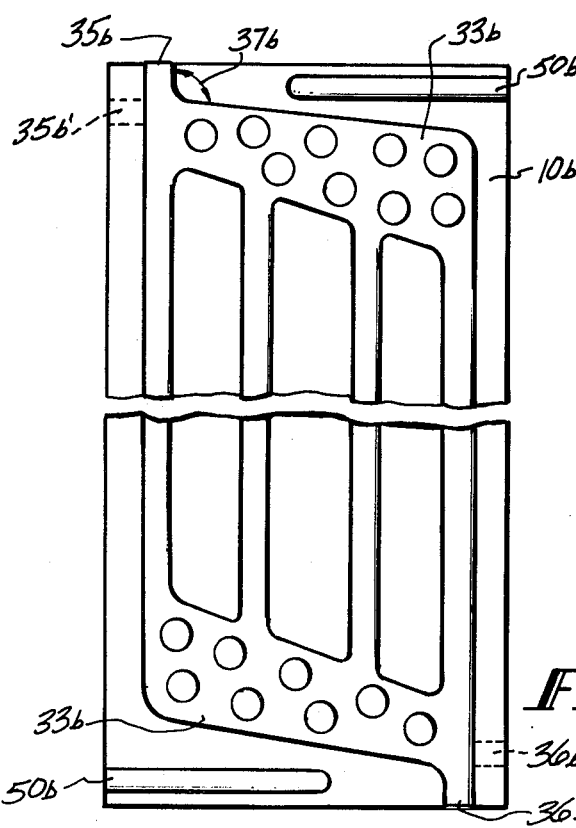
FIG. 9 is a top view showing a still further embodiment of heat exchange panel according to the present invention.

In the preferred embodiment, the entry and exit portions 35 and 36 intersect each respective header at the center thereof and are in a line with each other. If desired, however, the entry and exit portions may intersect each respective header at opposite ends thereof as shown by entry and exit portions 35b and 36b in FIG. 9. Naturally, also, the entry and exit portions may if desired extend in the same direction as the header as shown in FIG. 9 in phantom as 35b' and 36b'.

Figure 8:
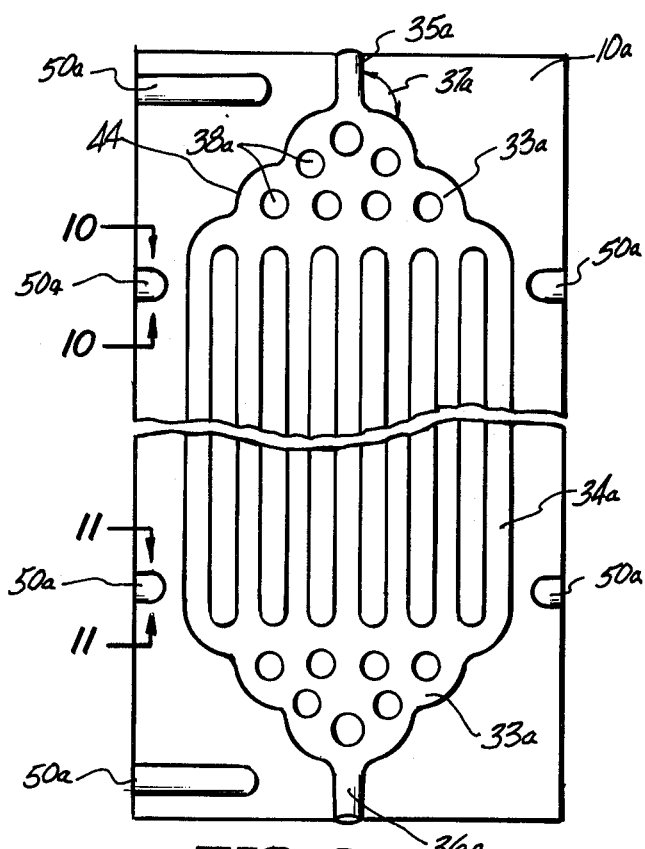
FIG. 8 is a top view showing an alternate embodiment of heat exchange panel according to the present invention.

The symmetrical design of the panels of the present invention makes the panels easier to handle so that either end may be the upper portion. The angled header feature promotes drainage in both ends of the panel. FIGS. 8 and 9 show variation in the panel design of the present invention. Naturally, numerous other variations can readily be devised. FIG. 8 shows a panel 10a wherein the portions of headers 33a defining an angle 37a with respect to entry and exit portions 35a and 36a, respectively, are scalloped as shown at 44. This header configuration enables efficient channeling of fluid flow throughout the system. As shown in FIG. 8, opposed headers 33a are connected by a plurality of individual, spaced parallel connecting portions 34a of said passageways extending between the headers. A plurality of bonded portions 38a are included in headers 33a. A plurality of said second passageways 50a are provided around the periphery of panel 10a for inclusion of a plurality of control means, if desired. FIG. 9 shows an alternative embodiment wherein panel 10b includes entry and exit portions 35b and 36b intersecting each respective header 33b at opposite ends thereof and defining angle 37b at opposite ends thereof. Two of said second passageways 50b are provided at opposite ends of panel 10b, one of which is adjacent entry portion 35b and the other of which is adjacent exit portion 36b.

Figure 10:
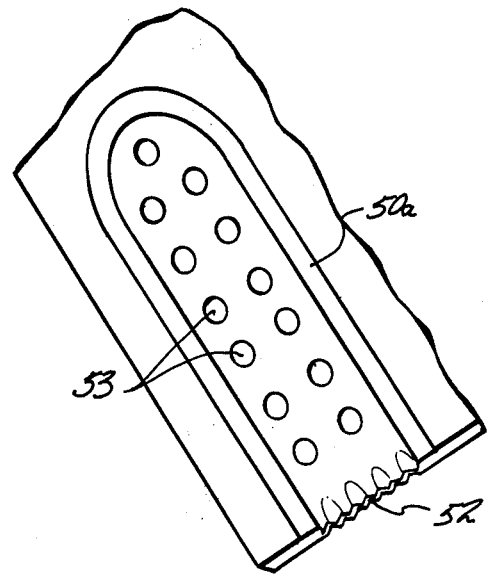
FIG. 10 is a sectional view taken along the lines 10—10 of FIG. 8 showing an enlarged view of a representative second passageway with the opening crimped shut.
Figure 11:
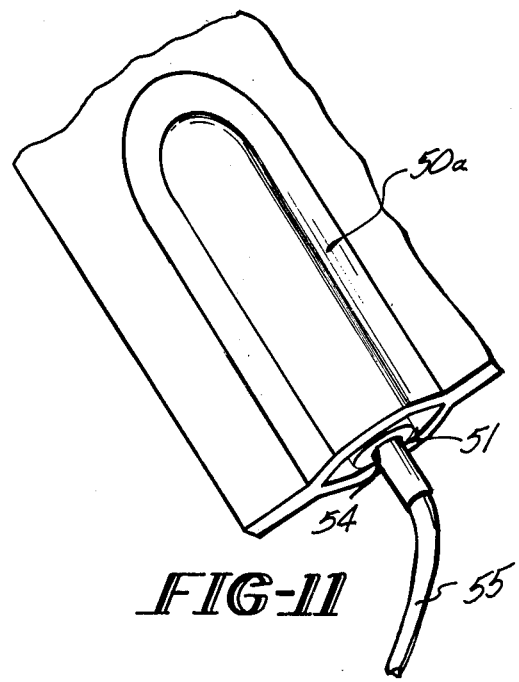
FIG. 11 is a sectional view taken along the lines 11—11 of FIG. 8 showing an enlarged view of a representative second passageway of the present invention with the opening thereof in the open position prior to crimping shut.

FIGS. 10 and 11 show details of the second passageway 50a. In accordance with FIG. 11, the second passageway is provided with opening 51 terminating at an edge of the panel. FIG. 10 shows the opening crimped shut at 52 to securely hold the control means therein. In accordance with FIG. 10, a plurality of holes 53 are drilled in the metal adjacent the second passageway 50a for including a desiccant charge in the second passageway, for example, a molecular sieve or silica gel. The holes allow for proper venting. This feature is particularly desirable in geographical areas where the venting of the solar collector box would cause condensate to form on the interior thereof. In accordance with FIG. 11, a temperature sensor 54 is provided within the second passageway with lead 55 extending therefrom. As indicated hereinabove, the temperature sensor is operatively connected to a means for controlling the flow of the heat exchange medium within the panels. Alternatively, or in addition, one may provide a low wattage heater within the second passageway for use under freezing conditions. This is particularly advantageous as it effectively avoids freeze-up problems.

An additional advantage of the present invention is that the secondary passages may be used to increase the structural strength of the unit by positioning them along the longitudinal and/or transverse panel edges.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A solar energy collector system including at least one heat exchange panel possessing a system of first internal integral tubular passageways defining opposed headers connected by connecting portions of said passageways extending therebetween, said passageways including entry and exit portions extending from opposite ends of said headers to provide ingress and egress openings for a heat exchange medium, said panel also possessing at least one internal integral second passageway, wherein one end of said second passageway is closed and arranged adjacent and in juxtaposition to said first internal tubular passageways but spaced therefrom and independent therefrom, and wherein another end of said second passageway terminates at an edge of said panel.

2. A system according to claim 1 including a plurality of said heat exchange panels and a common distribution manifold connected to each of said entry portions for distribution of said heat exchange medium therein and a common collection manifold connected to each of said exit portions for collection of said heat exchange medium therefrom.

3. A system according to claim 1 including two of said second passageways, one of which is adjacent said entry and one of which is adjacent said exit portion.

4. A system according to claim 1 including a temperature sensor within said second passageway operatively connected to means for controlling the flow of said heat exchange medium within said panel.

5. A system according to claim 4 wherein said temperature sensor is operatively connected to a control box which energizes a pump at a preselected temperature to move the heat exchange medium through the solar energy collector system.

6. A system according to claim 1 wherein said second passageway has a crimped outlet terminating at an edge of said panel.

7. A system according to claim 1 including a plurality of holes in said second passageway.

8. A system according to claim 7 including a desiccant charge within said second passageway.

* * * * *